United States Patent
Wohllebe et al.

[11] Patent Number: 5,971,431
[45] Date of Patent: Oct. 26, 1999

[54] AIRBAG ARRANGEMENT FOR MOTOR VEHICLES

[75] Inventors: Thomas Wohllebe, Braunschweig; Ruprecht Sinnhuber, Gifhorn, both of Germany

[73] Assignee: Volkswagen AG, Wolfsburg, Germany

[21] Appl. No.: 09/270,019

[22] Filed: Mar. 16, 1999

Related U.S. Application Data

[63] Continuation of application No. PCT/EP97/04861, Sep. 8, 1997.

[30] Foreign Application Priority Data

Oct. 10, 1996 [DE] Germany .......................... 196 41 759

[51] Int. Cl.$^6$ ..................................................... B60R 21/16
[52] U.S. Cl. .................... 280/732; 280/728.3; 280/730.1
[58] Field of Search .............................. 280/782.3, 730.1, 280/729, 732

[56] References Cited

U.S. PATENT DOCUMENTS

| | | | |
|---|---|---|---|
| 3,767,225 | 10/1973 | Mazelsky | 280/729 |
| 4,043,572 | 8/1977 | Hattori et al. | 280/729 |
| 4,300,894 | 11/1981 | Cumming et al. | 280/729 |
| 4,394,033 | 7/1983 | Goetz et al. | 280/736 |
| 4,948,168 | 8/1990 | Adomeit et al. | 280/732 |
| 5,074,583 | 12/1991 | Fujita et al. | 280/735 |
| 5,209,510 | 5/1993 | Mamiya | 280/732 |
| 5,630,610 | 5/1997 | Murakami et al. | 280/728.2 |
| 5,775,729 | 7/1998 | Schneider et al. | 280/730.1 |

FOREIGN PATENT DOCUMENTS

| | | |
|---|---|---|
| 1080764 | 7/1980 | Canada . |
| 4217174 | 11/1993 | Germany . |
| 4420114 | 12/1995 | Germany . |
| 06024286 | 6/1994 | Japan . |
| 08175317 | 7/1996 | Japan . |

*Primary Examiner*—Kenneth R. Rice
*Attorney, Agent, or Firm*—Baker & Botts, L.L.P.

[57] ABSTRACT

A motor vehicle airbag arrangement has an airbag stored behind a cover disposed in the region of the dashboard panel. When the airbag, which can be inflated by a gas generator, is triggered, the cover moves to form an opening so that the airbag can unfold into a position which protects a seat occupant's upper body. Unfolding of the airbag is controlled as a function of the position in which the occupant is sitting by using the cover as a shield for the unfolding airbag which can deflect part of the airbag into a position which provides additional protection for a further body region of the occupant. The size of the opening formed by moving the cover depends on the position in which the occupant is sitting at the time.

12 Claims, 2 Drawing Sheets

AIRBAG ARRANGEMENT FOR MOTOR VEHICLES

REFERENCE TO RELATED APPLICATION

This is a continuation of copending International application No. PCT/EP97/04861 filed Sep. 8, 1997.

BACKGROUND OF THE INVENTION

This invention relates to airbag arrangements for motor vehicles having controlled deployment of the airbag to protect an occupant.

Airbag arrangements for motor vehicles having one or more airbags are known in a wide variety of embodiments and for a wide variety of purposes. One component of these conventional arrangements may be a sensor system that determines the sitting position of the occupant to be protected in relation to the airbag in order to control the deployment of the airbag and the timing and extent of air bag deployment based on that determination. German Offenlegungsschrift No. 44 20 114 discloses an air bag arrangement for front and side protection having control electronics arranged for determining the direction and intensity of an impact as well as the seat occupancy and controlling the actuation of airbags individually or in combination based on the result of the determination.

Some conventional airbags are arranged behind a cover in an instrument panel that is opened to release the airbag and, in addition to providing protection for the upper body of a seat occupancy, providing protection for the occupant's knees as well. In the arrangement disclosed in U.S. Pat. No. 4,948,168, upon deployment of an airbag, a knee pad located behind the instrument panel trim is swung out of a rest position into a position adjacent to the occupant's knees. The knee pad may alternatively have the configuration of a flap, covering a storage compartment for the folded airbag and forming a part of the lower instrument panel trim which is joined to the overlying portion of the instrument panel trim by a tear edge or weak spot. In addition to the airbag for protection of the upper body, an auxiliary air bag for knee protection may be connected to the gas generator so as to project between a supporting wall integral with the vehicle frame and the protecting position of the knee pad in the activated condition.

Additionally, U.S. Pat. No. 4,394,033, discloses an airbag arrangement having a pressure-relieving device to render the airbag deployment as independent of temperature fluctuations as possible. This patent also shows that an airbag can be arranged so that it is able to protect both the upper body and the knees of the occupant.

Pressure relief valves are also employed to control the flow rate of gas to the airbag as a function of the seated position of the passenger, for example to diminish the gas flow if the occupant at the time of impact is not in his predetermined seated position but is leaning forward, i.e. is "out of position" so that the airbag will not act on the occupant with full gas pressure. To control the gas pressure in an airbag, step generators may also be employed, though they are rather costly.

Lastly, Canadian Patent No. 1,080,764 discloses an airbag arrangement disposed underneath the instrument panel which includes a hollow member providing knee impact protection and an airbag for protection of the occupant's upper body.

SUMMARY OF THE INVENTION

Accordingly, it is an object of the present invention to provide an airbag arrangement for motor vehicles which overcomes disadvantages of the prior art.

Another object of the invention is to provide an airbag arrangement for motor vehicles which has a fill characteristic adapted to the seated position of the vehicle occupant.

These and other objects of the invention are attained by providing an airbag arrangement in which an airbag is located behind a vehicle trim part and a movable cover exposes an opening in the trim part along with a sensor which determines the position of a vehicle occupant so that the cover is moved to control the size of the opening for the airbag.

In a particular embodiment, the airbag is arranged in a conventional manner behind a trim part, which may be an instrument panel, glove compartment, door lining, seat cushion or the like, of a motor vehicle, and a cover exposes an opening of predetermined size for deployment of the airbag to protect the occupant. Preferably, the cover has the configuration of a stable shield which exposes the opening completely if the occupant is in a predetermined position and exposes the opening only partially in a controlled manner in response to sensor signals indicating that the occupant is out of position. Thus, the size of the opening is controlled as a function of the occupant's position as determined in a conventional manner by suitable sensors; the airbag is acted upon by the full flow of gas, but if the occupant is out of position, only part of the airbag reaches the protective position for the occupant's body, the size of that part being determined by the size of the opening. The remaining part of the airbag is directed into an open space behind the instrument panel or into a position that provides an additional protective cushion for a portion of the occupant's body, preferably the knee portion.

Preferably, the cover is arranged as a hinged part, mounted behind the instrument panel for swinging motion about an axis extending transverse to the longitudinal direction of the vehicle. A cover having this construction can be adapted in simple manner to the conformation of the instrument panel and be integrated therein.

It is expedient to provide the opening for the airbag at a location above the cover because the weight of the cover will then assist a downward motion, caused by the deployment of the airbag, into an open position. In this case, a guide element may be provided on the inside of the cover, first guiding the deployment of the airbag toward the opening to be formed and second applying a component of force to swing the cover downwardly. In the storage position of the airbag, the cover can be retained in a position which covers the airbag completely by a simple catch device which is released by the deploying airbag.

For adjustment of the size of the opening, the cover may be arranged to cooperate with a stop movable to any of several vertical positions as a function of the occupant's position, the cover position at a given time being constantly adapted by a conventional control system to the occupant's position independently of any airbag deployment.

According to a preferred embodiment, the part of the airbag that is not used to protect the occupant's upper body is utilized to form an additional protective element for the occupant's knees by being guided into a location in front of the occupant's knees and being supported in that position by a frontal rest in the vehicle. Alternatively, that part of the airbag is used to support a knee pad arranged on the instrument panel. In this case, the extent of the protective effect is determined by the size of the airbag part which is available in the knee region, and hence is determined ultimately by the occupant's position.

The airbag is preferably folded like an accordion and may be arranged in relation to the gas generator so that the flow of gas emerging from the generator enters directly into the folds of the bag and effects unimpeded deployment without delay in a simple manner. Such an arrangement is provided if an accordion-pleated airbag is oriented vertically.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
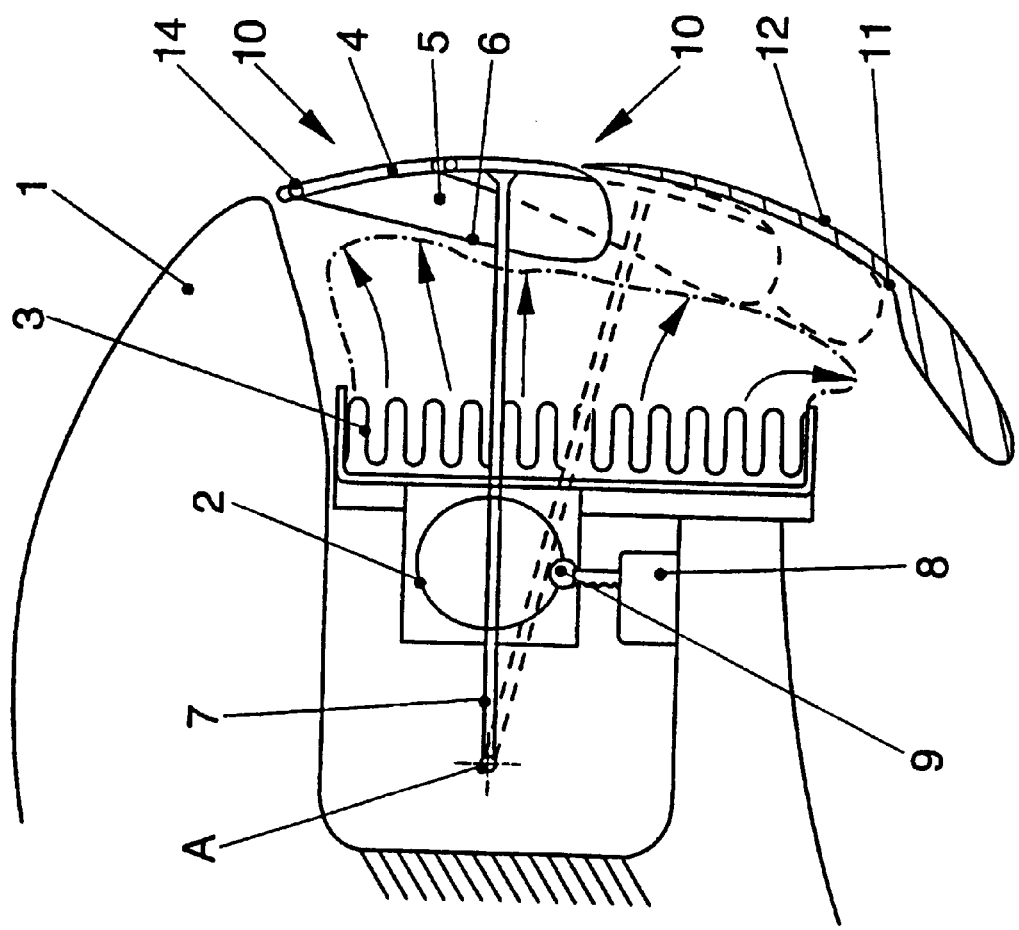
FIG. 1 is a schematic side view illustrating a representative embodiment of an airbag arrangement according to the invention with a folded airbag in storage position.

In the typical embodiment shown in FIG. 1, an airbag arrangement for a motor vehicle includes an airbag 3 positioned behind an instrument panel 1 and inflatable by a gas generator 2, along with a cover 4 located in the region of the instrument panel 1. The cover 4 is substantially inflexible and has a guide element 5 with an inclined surface 6 on the inside to guide the airbag 3. The cover is formed as a shield for the deploying airbag 3 in such manner that the airbag 3, depending on the position of the cover 4, can deploy either only above the cover or both above and below the cover.

The cover 4 is formed as a hinged part with two swing levers 7 arranged laterally on opposite sides in the region behind the instrument panel 1 so that it is swingable about an axis A extending transverse to the lengthwise direction of the vehicle. The range of downward swinging motion of the levers 7 is determined by adjustable stops 9, one for each lever, which are operated by a control unit 8. Further, the cover 4 is so arranged that it completely covers the airbag 3 when the airbag is folded in storage position behind the instrument panel and, on deployment of the airbag 3, the cover swings downwardly to provide an opening 10 and, as shown in broken lines, moves behind a knee pad 11 arranged on the instrument panel 1. The airbag 3 is folded like an accordion in the storage position with a vertical stack of pleats 12 and the pleats are arranged along the direction of the flow of gas generated in event of impact as shown by the arrows.

Figure 2:
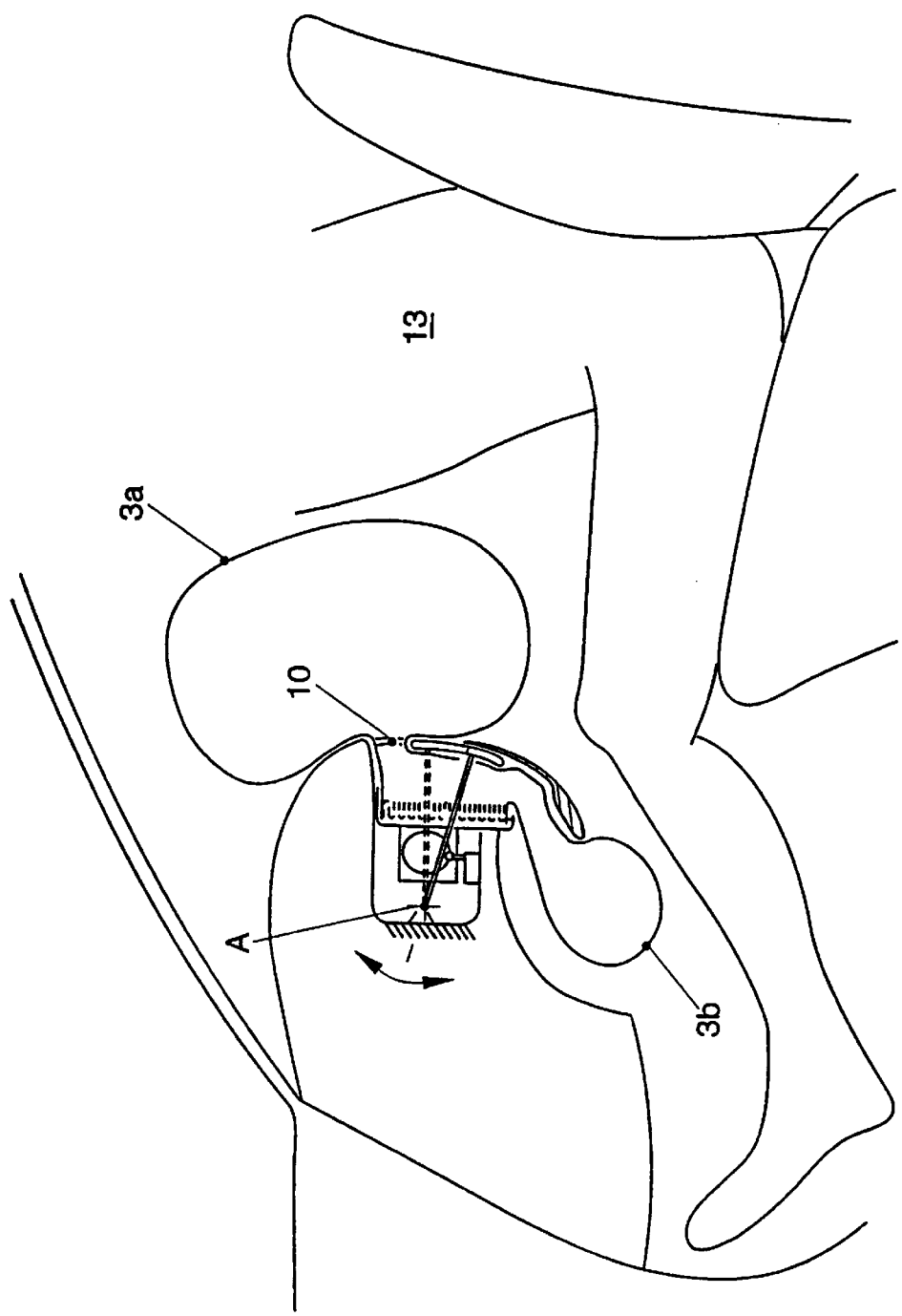
FIG. 2 is a schematic view illustrating the arrangement of FIG. 1 with the airbag deployed.

FIG. 2 shows the airbag in deployed condition in the case of an occupant 13 who is "out of position". In the illustrated example, the occupant is closer to the instrument panel 1 than in a normal predetermined seated position. A greater part 3a of the deployed airbag 3 has been extended into a protective position for the occupant's upper body, and a smaller part 3b of the airbag has assumed a protective position partly behind the knee pad 11, for the occupant's knees. In this position, the opening 10 is only partly exposed by the downward swing of the cover 4.

In the storage position of the airbag 3, the cover 4 is releasably suspended from the instrument panel 1 by laterally arranged catch elements 14 (not shown in detail). Conventional sensors monitor the seat occupancy condition, i.e. the presence and position of a vehicle occupant 13, and control the setting of the two stops 9 in a stepwise or continuous manner through the control unit 8. In case of an impact, the gas generator 2 is actuated and the resulting flow of gas presses the airbag against the inclined surface 6 of the guide element 5 in the cover 4, so that the cover, as a result of the component of force directed downwardly, is released from its catch position and, assisted by its own weight, swings downwardly until the levers 7 engage the corresponding stops 9. The setting of the stops 9 determines the size of the opening 10 as well as the size of the free space available for the airbag under the cover 4. The closer an occupant is to the instrument panel 1, the smaller will be the opening 10 formed between the cover 4 and the instrument panel 1 for the airbag deployment to provide the protective portion 3a for the upper body and the greater will be the cleared space below the cover 4, so that the protective portion 3b for the knee region will be correspondingly larger. The larger the opening 10, the smaller the open space below the cover 4 and the larger the portion 3a of the deploying airbag 3. The portion 3a of the airbag 3 attains its maximum size when the occupant 13 is located in his predetermined normal seated position.

In an especially preferred embodiment, the cover 4 constitutes an impact element which is supported from the vehicle frame by energy-absorbing elements. Such energy-absorbing elements may be telescoping swing levers 7 having a force-limiting arrangement and/or deformable mountings for the shaft A. After a predetermined swing motion of the lever 7, depending on vehicle type, has been completed a locking action or a force-limited restoring action can be provided.

Although the invention has been described herein with reference to specific embodiments, many modifications and variations therein will readily occur to those skilled in the art. Accordingly, all such variations and modifications are included within the intended scope of the invention.

We claim:

1. An airbag arrangement for a motor vehicle comprising:

an airbag stored behind an interior trim part of a motor vehicle and inflatable by a gas generator;

a cover for the stored airbag adjacent to the interior trim part, the cover being movable upon an airbag release to expose an opening for deployment of the airbag into a protective position for a portion of an occupant's body; and sensor means for detecting an accident situation as well as a seat occupancy condition and supplying signals to control the size of the opening for deployment of the airbag in an accident situation.

2. An airbag arrangement according to claim 1 wherein the cover constitutes a shield for the deploying airbag so that a portion of the airbag is directed into an additional position providing protection for another portion of the occupant's body.

3. An airbag arrangement according to claim 1 wherein the size of the opening is determined by a seat occupant's position.

4. An airbag arrangement according to claim 1 wherein the interior trim part is an instrument panel.

5. An airbag arrangement according to claim 2 wherein the additional position is at the level of the knees of the occupant.

6. An airbag arrangement according to claim 1 wherein the size of the opening is controlled in a stepwise manner.

7. An airbag arrangement according to claim 1 wherein the cover is swingably mounted behind an instrument panel for motion about an axis extending transverse to the longitudinal direction of the vehicle.

8. An airbag arrangement according to claim 1 wherein the inside of the cover has a guide element for the airbag.

9. An airbag arrangement according to claim 1 wherein the cover cooperates with a stop which is fixable in any of several vertical positions which are determined by a seat occupant's position.

10. An airbag arrangement according to claim 2 wherein the additional protective position of the airbag is behind a knee pad located on an instrument panel.

11. An airbag arrangement according to claim 1 wherein the airbag has accordion-pleated folds and is arranged so that the flow of gas emerging from the gas generator enters directly into the folds.

12. An airbag arrangement according to claim 5 wherein the cover constitutes an impact element supported at least indirectly from the vehicle frame by at least one energy-absorbing element.

* * * * *